(12) United States Patent
Kummer-Dörner et al.

(10) Patent No.: US 9,540,509 B2
(45) Date of Patent: Jan. 10, 2017

(54) IMPREGNATED REINFORCING FIBER YARN AND ITS USE IN PRODUCING COMPOSITE MATERIALS

(71) Applicant: TOHO TENAX EUROPE GMBH, Wuppertal (DE)

(72) Inventors: Sabine Kummer-Dörner, Schwelm (DE); Silke Stüsgen, Neuss (DE); Silke Witzel, Wuppertal (DE); Jens Pusch, Wegberg (DE); Markus Schneider, Düsseldorf (DE); Bernd Wohlmann, Düsseldorf (DE)

(73) Assignee: TOHO TENAX EUROPE GMBH, Wuppertal (DE)

( * ) Notice: Subject to any disclaimer, the term of this patent is extended or adjusted under 35 U.S.C. 154(b) by 47 days.

(21) Appl. No.: 14/655,898

(22) PCT Filed: Jan. 21, 2014

(86) PCT No.: PCT/EP2014/051084
§ 371 (c)(1),
(2) Date: Jun. 26, 2015

(87) PCT Pub. No.: WO2014/114617
PCT Pub. Date: Jul. 31, 2014

(65) Prior Publication Data
US 2015/0376404 A1 Dec. 31, 2015

(30) Foreign Application Priority Data

Jan. 28, 2013 (EP) ..................................... 13152863

(51) Int. Cl.
| | | |
|---|---|---|
| *B32B 5/28* | (2006.01) | |
| *B32B 5/24* | (2006.01) | |
| *B32B 27/04* | (2006.01) | |
| *B32B 27/12* | (2006.01) | |
| *B32B 27/14* | (2006.01) | |
| *B32B 27/40* | (2006.01) | |
| *C08L 75/08* | (2006.01) | |
| *C08J 5/24* | (2006.01) | |
| *C09D 175/08* | (2006.01) | |
| *D06B 3/04* | (2006.01) | |
| *D06B 5/06* | (2006.01) | |

(52) U.S. Cl.
CPC ...... *C08L 75/08* (2013.01); *C08J 5/24* (2013.01); *C08J 2363/00* (2013.01); *C08J 2375/04* (2013.01)

(58) Field of Classification Search
None
See application file for complete search history.

(56) References Cited

U.S. PATENT DOCUMENTS

| | | |
|---|---|---|
| 4,614,678 A | 9/1986 | Ganga |
| 5,275,883 A | 1/1994 | Leone et al. |
| 6,117,551 A | 9/2000 | Nagata et al. |
| 6,228,474 B1 | 5/2001 | Kishi et al. |
| 2004/0241441 A1 | 12/2004 | Adzima et al. |
| 2007/0196636 A1 | 8/2007 | Schneider et al. |
| 2011/0259514 A1 | 10/2011 | Boyle et al. |
| 2012/0052284 A1 | 3/2012 | Harrington et al. |
| 2012/0328858 A1 | 12/2012 | Fujiwara et al. |
| 2014/0205831 A1 * | 7/2014 | Schneider ............. D06M 15/55 428/221 |

FOREIGN PATENT DOCUMENTS

| | | | | |
|---|---|---|---|---|
| EP | 0554950 A1 | 8/1993 | | |
| JP | 61-138617 A * | 6/1986 | ............. | C08G 18/58 |
| WO | 98/50211 A1 | 11/1998 | | |
| WO | 2005/095080 A1 | 10/2005 | | |
| WO | WO 2013/017434 A1 * | 2/2013 | ............. | B29B 15/10 |

OTHER PUBLICATIONS

Machine translation of JP 61-138617 A (no date).*
Database WPI XP002698870.
Apr. 7, 2014 International Search Report issued in International Application No. PCT/EP2014/051084.

* cited by examiner

*Primary Examiner* — Michael J Feely
(74) *Attorney, Agent, or Firm* — Oliff PLC

(57) ABSTRACT

A pre-impregnated yarn including a bundle of reinforcing fiber filaments having a bundle interior and a bundle outer side, a first resin composition, and a second resin composition. The first resin composition includes at least one urethane resin, H1, produced from a reaction of a bifunctional aromatic epoxy compound based on bisphenol A, an aromatic polyisocyanate, and a polyalkylene glycol; an oxyalkylated bisphenol A resin, H2; and aromatic polyhydroxy ether P1. The filaments are impregnated with and at least partially connected via the first resin composition. The first resin composition is present in a concentration of 0.1 to 4 wt % relative to a total weight of the pre-impregnated yarn. The second resin composition is on the bundle outer side in the form of particles or drops adhering to the filaments, and is in a concentration of 0.5 to 14 wt % relative to the total weight of the pre-impregnated yarn.

17 Claims, No Drawings

IMPREGNATED REINFORCING FIBER YARN AND ITS USE IN PRODUCING COMPOSITE MATERIALS

The invention relates to a pre-impregnated yarn consisting of a bundle of reinforcing fiber filaments having a bundle interior and a bundle outer side, wherein the reinforcing fiber filaments are impregnated with a first resin composition infiltrated into the pre-impregnated yarn, which composition can be multiply melted and converted to a solid state by cooling to ambient temperature. The invention further relates to a textile structure which comprises a yarn of this type.

Components made from fiber composite materials are increasingly used, especially in the aerospace industry, yet also e.g. in machine building, wind power, or the automotive industry. Fiber composite materials often offer the advantage of lower weight and/or higher strength over metals. An essential aspect thereby is the inexpensive production of this type of resilient and yet lightweight composite material components at the same time. In view of the resistance, i.e. the rigidity and strength, the volume percent of the reinforcing fibers and especially also the direction of the reinforcing fibers have a decisive effect on composite material components.

A commonly used manufacturing method is currently based on the so-called prepreg technology. In this case, the reinforcing fibers, such as glass fibers or carbon fibers, are arranged for example parallel to one another, embedded in a matrix resin, and processed into sheet-like semi-finished products. For component manufacture, these sheets are cut according to the component contour and laminated layer-by-layer into a tool by machine or by hand while taking into account the orientation of the reinforcing fibers as required by the component load. Subsequently, the matrix is cured under pressure and at temperature in an autoclave. Prepregs (abbreviation for pre-impregnated fibers) already have as a rule the two components (fiber and matrix resin) in the final mixture ratio and are therefore already bending resistant as a semi-finished product. In order to prevent premature, undesired reactions, this material must additionally be stored under cool conditions and at the same time has only a limited storage period. Due to the bending stiffness and the production as wide rolled goods, the applications for prepregs are limited to large-surface and virtually flat components. The matrix resin already present does not allow for textile processing or laying of the prepregs without folds, for example along narrow radii or on strongly contoured geometries.

Examples for achieving improved textile processing with impregnated yarn products are described e.g. in U.S. Pat. Nos. 5,275,883 and 4,614,678, which disclose reinforcing fiber yarns provided with a coating. According to these documents, the reinforcing fiber yarns are initially loaded with a mixture of a polymer powder and subsequently coated with a sheath preferably made from a thermoplastic polymer in order to stabilize the polymer powder in the interior. These yarn materials do indeed have a certain flexibility; however, as a result of the continuous thermoplastic sheath they are still relatively rigid, and therefore are only limited suitability for e.g. further textile processing methods.

Similar products are disclosed in EP-A 0 554 950 A1, which relates to a method in which initially an open yarn bundle of reinforcing fibers is impregnated with a thermoplastic polymer powder and subsequently the impregnated fiber bundle is provided with a continuous sheath made of a thermoplastic polymer. The resulting sheathed bundle is calendered at a temperature above the softening temperature of the thermoplastic, after which the bundle is finally cut into granular form. The granules serve for producing composite components via methods like extrusion or injection molding.

In EP-A-0 814 916 B1, so-called yarn prepregs ("towpregs") are described, which are suitable for use in textile preform processes, wherein weaving, braiding, or knitting processes, among others, or winding methods ("filament winding") belong to textile preform processes of this type, or the yarn prepregs can be processed into short-cut material. The yarn prepregs from EP-A-0 814 916 B1 comprise a plurality of fibers as well as a coating made of matrix resin, wherein the fibers are structured in an arrangement of inner fibers, which are substantially free of matrix resin, and outer fibers, wherein the outer fibers are at least partially embedded in a non-continuous sheath made of the matrix resin. The production of the yarn prepreg takes place by applying powdery particles of the matrix resin to the outer fibers and subsequently partially melting the matrix resin particles. The matrix resin used can be a thermoset or a thermoplastic material.

U.S. Pat. No. 6,228,474 also deals with the production of yarn prepregs made of reinforcing fiber bundles impregnated with an epoxy resin composition, wherein the resin proportion in the yarn prepregs lies in the range from 20 to 50 wt. %. The epoxy resin composition in one embodiment can comprise two or more epoxy resins and be a mixture of monofunctional or bifunctional epoxy resins with trifunctional or polyfunctional epoxy resins. This epoxy resin composition further comprises fine particles of a rubber material that is insoluble in the epoxy resins as well as curing agent components for the epoxy resins.

Yarn prepregs must have a sufficiently high proportion of matrix resin, typically more than 15 vol. %, in order to allow for consolidation to a component structure that is substantially free of cavities or pores without requiring the addition of further matrix resin. Yarn prepregs of this type do indeed have a higher flexibility over sheet-like prepregs. However, they can only be further processed in a limited way in textile processes due primarily to the high matrix resin proportion. In addition, the presence of the matrix resin often leads to an increased tackiness of the yarn prepregs, which results in an increased complexity during handling of these yarn prepregs. In addition, as a rule, continuous cooling of the yarn prepregs is required up until the time of processing in order to prevent an uncontrolled curing of the matrix resin. Finally, yarn prepregs have disadvantages in the production of three-dimensional structures and, for example, cannot be repeatedly re-shaped.

Increasingly, fiber composite components made from reinforcing fibers are produced via so-called near-net-shape fiber preforms. Essentially, these fiber preforms are textile semi-finished products in the form of two- or three-dimensional configurations made from reinforcing fibers, in which, in further steps for producing the fiber composite component, a suitable matrix material is introduced via infusion or injection, also by application of vacuum. Subsequently, the matrix material is cured as a rule at increased temperatures and pressures to form the finished component. Known methods for infusion or injection of the matrix material in this case are the so-called liquid molding (LM) method, or methods related thereto such as resin transfer molding (RTM), vacuum assisted resin transfer molding (VARTM), resin film infusion (RFI), liquid resin infusion (LRI), or resin infusion flexible tooling (RIFT). For these applications, reinforcing fibers are used that are not yet provided with matrix resin in the amount required for the later composite component because the matrix material is, as previously stated, introduced into the finished fiber preform in a subsequent process step. On the other hand, it is advantageous if the fiber material used for the production of the fiber preforms is already impregnated with e.g. small amounts of a plastic material, i.e. a binder material, that is e.g. curable or solidifies at reduced temperature, in order to improve the fixing of the reinforcing fibers in the fiber preform and to impart a sufficient stability to the fiber preform.

WO 98/50211 relates to reinforcing fibers coated with a binder material and suitable for use in the production of fiber preforms, to which fibers the binder material is applied in the form of particles or discrete regions to the surface of the reinforcing fibers. The binder material consists of 40 to 90 wt. % of a thermoset resin and 10 to 60 wt. % of a thermoplastic, which is tailored to the matrix material used in the later fiber composite component produced from the fiber preform. The binder material applied to the reinforcing fibers is solid and non-tacky at ambient temperature. According to WO 98/50211, the reinforcing fibers thus coated or, e.g. the woven fabrics produced therefrom, have a good drapability. According to WO 98/50211, the individual yarn strands can initially be provided with the binder material and subsequently processed into woven fabrics. The yarns from WO 98/50211 are not suitable for the production of flat yarn strands with a fixed yarn width, which flat yarn strands would be amenable to an automated, direct processing into fiber preforms. In addition, the reinforcing fibers coated with binder material from WO 98/50211 can have in part relatively high proportions of binder material of up to 20 wt. %, which can result in significantly impaired impregnation behavior in the fiber preforms produced therefrom.

Pre-impregnated yarns for the production of fiber preforms are also described in WO 2005/095080. Regarding the yarns of WO 2005/095080, the filaments of the pre-impregnated yarns are at least partially connected via a resin composition, wherein the yarns have 2.5 to 25 wt. % of the resin composition in relation to the total weight of the yarns, wherein the resin composition is composed of a mixture of at least two epoxy resins, and wherein the epoxy resins are different with respect to their epoxy value and molecular weight. The weight ratio of the epoxy resins in the mixture is selected such that the resin composition has an epoxy value between 550 and 2100 mmol/kg of resin. Alternatively, a mixture of three bisphenol A epichlorohydrin resins is proposed with defined characteristics of the resins with respect to epoxy value, molecular weight, and melting point. The resin compositions are selected such that they can be multiply melted and can be converted again to a solid state by cooling to ambient temperature, and that the yarns impregnated therewith are non-tacky at ambient temperature, yet are tacky at increased temperatures. However, it has been shown that yarns impregnated with the resin compositions from WO 2005/095080 do not have a sufficient tackiness for all applications, e.g. for applications in which yarns are laid over each other at an angle of for example 90°.

There is therefore a need for improved pre-impregnated yarns for the production of fiber preforms. It is therefore the object of the present invention to provide improved pre-impregnated reinforcing fiber yarns of this type, in particular for use in the production of fiber preforms.

The object is achieved by a pre-impregnated yarn consisting of a bundle of reinforcing fiber filaments with a bundle interior and a bundle outer side, wherein the reinforcing fiber filaments are impregnated with a first resin composition infiltrated into the pre-impregnated yarn and the filaments of the pre-impregnated yarn are at least partially connected via the first resin composition, and wherein the first resin composition contains at least one urethane resin H1, produced from a reaction of a bifunctional aromatic epoxy compound based on bisphenol A, an aromatic polyisocyanate, and a polyalkylene glycol, and an oxyalkylated bisphenol A resin H2, the resins H1 and H2 are present in a weight ratio H1:H2 of 1 to 15 and the mixture of the resins H1 and H2 has a viscosity of 10 to 10,000 Pa s at ambient temperature, wherein the pre-impregnated yarn is characterized in that it has 0.1 to 4 wt. % of the first resin composition in relation to the total weight of the yarn, and the first resin composition further contains an aromatic polyhydroxy ether P1, which has an acid value of 40 to 55 mg KOH/g and an average molecular weight $M_N$ of 4000 to 5000 g/mol, and that the pre-impregnated yarn has a second resin composition on the bundle outer side in the form of particles or drops adhering to the reinforcing fiber filaments, wherein the second resin composition is solid at ambient temperature, has a melting temperature in the range from 80 to 150° C., and is present on the bundle outer side in a concentration of 0.5 to 14 wt. % in relation to the total weight of the pre-impregnated yarn, wherein at least 40% of the surface of the bundle outer side is free of the second resin composition, and wherein the bundle interior is free of the second resin composition.

It was found that the yarn pre-impregnated in such a way possesses excellent dimensional stability and can be multiply melted and converted to a solid state or quasi-solid state by cooling to ambient temperature. In addition, the resin for the yarns according to the invention can be selected such that the yarn to be coated therewith is non-tacky at ambient temperature. In this case, a non-tacky state is understood as a state, such as is e.g. also present for commercially available standard carbon fibers and which enables a problem-free unwinding e.g. from bobbins. Therefore, a yarn of this type then can be not only wound up, but also stored in the wound up state while retaining its textile characteristics and can even be unwound again after a long storage period at ambient temperature. For example, the yarn according to the invention can be unwound without problems after 12 months of storage and shows at most negligible changes for the characteristics of strength, elastic modulus, and elongation at break measured according to DIN 65 382. In a preferred embodiment, the first and/or the second resin composition is free of curing agents.

The yarn according to the invention can be a yarn made of short fiber filaments or a yarn made of endless filaments. In the case that the yarn consists of endless filaments, the number of filaments can lie preferably in the range from 6000 to 48000 filaments, and particularly preferably in the range from 12000 to 24000 filaments. Likewise, yarns having a linear density in the range from 400 to 32000 tex are preferred, and particularly preferred yarns are those having a linear density in the range from 800 to 16000 tex.

In a further preferred embodiment, the yarn according to the invention is a carbon fiber yarn produced from pitch, polyacrylonitrile, lignin, or viscose pre-products, or the yarn is an aramid, glass, ceramic, or boron fiber yarn, a synthetic fiber yarn, or a natural fiber yarn, or a combination of one or more of these fibers. The yarn according to the invention is particularly preferably a carbon fiber yarn.

The yarns according to the invention have a first resin composition, one component thereof being a urethane resin, H1. Pre-impregnated yarns of this type made of reinforcing fiber filaments have a good durability as well as in particular also a good compatibility with urethane resin matrices often used for producing composite materials.

The urethane resin H1 according to the invention is produced from a reaction of a bifunctional aromatic epoxy compound based on bisphenol A, an aromatic polyisocyanate, and a polyalkylene glycol. As a bifunctional aromatic epoxy compound based on bisphenol A, preferably a bisphenol A epichlorohydrin resin with a molecular weight of 600-1200 g/mol is used. As an aromatic polyisocyanate, preferably diisocyanates can be used, in particular toluene diisocyanate, and as a polyalkylene glycol, polyethylene glycol, polypropylene glycol, polybutylene glycol or similar compounds can be used. Preferred urethane resins are such with an epoxy value of 250-1000 mmol/kg and particularly preferred from 400-900 mmol/kg, which can be obtained via the reaction control in the production of the urethane resin.

The oxyalkylated bisphenol A resin H2 can preferably be a reaction product of bisphenol A and an alkylene oxide such as ethylene oxide or propylene oxide or mixtures thereof.

On the one hand to obtain stable coherence of the filaments of the pre-impregnated yarn, yet on the other also good flexibility and drapability of the yarn, the mixture of the resins H1 and H2 has a viscosity at ambient temperature of 10 to 10,000 Pa s. Preferably the viscosity lies in the range from 100 to 5,000 Pa s. The viscosity of the mixture of the resins H1 and H2 can be set via the reactants of the urethane resin, such as in particular the aromatic epoxy compound based on bisphenol A, or via the weight ratio H1:H2 of the resins H1 and H2. In a preferred embodiment the resins H1 and H2 are present in a weight ratio H1:H2 in the range from 3 to 12.

As previously stated, the yarn of the invention has a high dimensional stability, wherein this is understood to mean that the yarn has a stable, fixed yarn width or a stable ratio of yarn width to yarn thickness that also remains unchanged even if the yarn according to the invention is held unsupported over large distances under tension or is further processed in textile processes. Due to this excellent dimensional stability, automated processing, for example automated laying to form fiber preforms, is enabled. In addition, the fixed and consistent yarn width of the yarns of th invention leads to more stable adhesion of superimposed yarns during the production of fiber preforms. It was found that the dimensional stability of the yarn of the invention is essentially a result of the first resin composition, with which the pre-impregnated yarn is infiltrated, wherein the proportion of the aromatic polyhydroxy ether P1 plays a major role.

In a preferred embodiment the first resin composition contains the urethane resin H1 and the oxyalkylated bisphenol A resin H2 in a weight ratio to the aromatic polyhydroxy ether P1, (H1+H2):P1, of 0.05 to 20 and particularly preferably in a weight ratio of 0.25 to 10. It was observed in tests that weight ratios lower than 0.05 can lead to increased yarn abrasion. Weight ratios greater than 20 in contrast lead to yarns with an excessively low dimensional stability. In view of the dimensional stability on the one hand and the drapability on the other, it is also advantageous if the first resin composition is present in a concentration of 0.4 to 3 wt. % in relation to the total weight of the pre-impregnated yarn.

In a preferred embodiment the first resin composition further contains an ester H3 of a long-chain saturated monofunctional carboxylic acid and of an aliphatic monofunctional alkanol. Long-chain saturated monofunctional carboxylic acids are preferably n-carboxylic acids with a total of 5 to 20 and particularly preferably with a total of 15 to 20 carbon atoms, wherein the long-chain saturated monofunctional carboxylic acids can be present also as a mixture of several of these carboxylic acids. Preferred examples are for instance n-hexadecanoic acid or n-octadecanoic acid or similar compounds. The aliphatic monofunctional alkanol can be preferably a linear or a branched aliphatic alcohol, preferably with a total of 2 to 15 and particularly preferably with 3 to 10 carbon atoms. Branched aliphatic alcohols such as isopropyl alcohol or isooctanol are most suitable. Advantageous H3 esters are e.g. isopropyl stearate, isobutyl stearate, or isooctyl stearate etc., or appropriate esters of n-pentadecanoic acid, n-hexadecanoic acid, or heptadecanoic acid, etc . . . Through the addition of an ester H3 an improvement of the abrasion behavior of the pre-impregnated yarn is achieved. It is advantageous if the concentration of the ester H3 is in the range from 0.001 to 0.5 wt. % in relation to the total weight of the pre-impregnated yarn. It is likewise preferred if the components H1, H2, and H3 of the first resin composition are present in a ratio (H1+H2+H3):P1 to the aromatic polyhydroxy ether P1 in the range from 0.05 to 20, preferably in the range from 0.25 to 10.

It is likewise preferred if the first resin composition further contains a bisphenol A epichlorohydrin resin H4 and a bisphenol A epichlorohydrin resin H5 in a weight ratio H4:H5 of 1.1 to 1.4, wherein H4 has an epoxy value from 1850 to 2400 mmol/kg, an average molecular weight $M_N$ of 800 to 1000 g/mol, and is solid at ambient temperature, and H5 has an epoxy value of 5000 to 5600 mmol/kg, an average molecular weight $M_N$ of <700 g/mol, and is liquid at ambient temperature. In this case, a ratio (H1+H2) of the components H1 and H2, or when an ester H3 is present a ratio (H1+H2+H3) of the components H1, H2, and H3, of the first resin composition to (H4+H5+P1) of the other components of the first resin composition lies preferably in the range from 0.05 to 20, preferably from 0.25 to 10.

The yarn according to the invention can be brought in a simple way into the shape of a flat band already in the production of the yarn, in that the initially impregnation-free, easily spreadable yarn can be fed into and through a bath via suitable spreading devices and impregnated with the first resin composition. The first resin composition thereby connects the filaments of the yarn at least partially and ensures a very good consolidation. In addition, due to its composition, the first resin composition imparts a high dimensional stability to the spread and now impregnated yarn, by which means the ribbon shape remains unchanged and the yarn can be wound up, e.g. on spools, in this shape after the application of the second resin composition. Later, then, the pre-impregnated yarn can be processed, without additional measures such as the transfer via suitable spreading devices, by means of routine laying methods to produce textile structures, such as two- or three-dimensional fiber preforms or two-dimensional structures, for example in the form of unidirectional wovens or multiaxial lay-ups. The high dimensional stability enables an advantageous embodiment of the pre-impregnated yarn wherein said yarn is a flat band that has a ratio of yarn width to yarn thickness of at least 10. In a particularly preferred embodiment, the flat band has a ratio of yarn width to yarn thickness in the range from 12 to 60.

Due to the second resin composition applied to the bundle outer side, it is achieved in the pre-impregnated yarns according to the invention that these are non-tacky at ambient temperature and can be e.g. wound up as described. At increased temperature, however, a high tackiness is achieved due to the second resin composition, which tackiness also leads to a high stability of the structure of the fiber preform after cooling, even in structures in which the yarns of the invention are laid superimposed over one another at an angle. When using the yarn according to the invention, preforms can therefore be produced without requiring the costly addition of binder material for fixing the yarns, wherein a better binding still results between the yarns than in a preform of the prior art.

At the same time, it was found that in the indicated concentration of the second resin composition, in particular the type of application of the second resin composition in the form of particles or drops adhering to the reinforcing fiber filaments, wherein at least 40% of the surface of the bundle outer side is free of the second resin composition and wherein the bundle interior is free of the second resin composition, leads to pre-impregnated yarns with high flexibility and good drapability. It thereby is shown to be advantageous if the particles or drops of the second resin composition adhering to the reinforcing fiber filaments have a size less than 300 μm, and particularly advantageous if they have an average size in the range from 20 to 150 μm. In particular with a view to drapability it has also been found as advantageous if the concentration of the second resin composition on the bundle outer side lies in the range from 1 to 10 wt. %, in relation to the total weight of the pre-impregnated yarn, and particularly advantageous if it lies in the range from 1.5 to 7 wt. %.

To achieve in particular the characteristics of the present yarn with respect to its tackiness or its adhesive strength, the second resin composition contains in a preferred embodiment at least 50 wt. % of a bisphenol A epichlorohydrin resin H6 with an epoxy value of 480 to 645 mmol/kg and an average molecular weight $M_N$ of 2700 to 4000 g/mol, an aromatic polyhydroxy ether P2, a polyamide, a polyethylene, an ethylene copolymer such as an ethylene vinyl acetate (EVA) copolymer, or a thermoplastic polyurethane resin, or mixtures of these compounds, wherein these compounds have a melting temperature in the range from 80 to 150° C. Thereby, embodiments are also comprised in which e.g. the bisphenol A epichlorohydrin resin H6 is a mixture of two or more bisphenol A epichlorohydrin resins, so long as the mixture has an epoxy value of 480 to 645 mmol/kg, an average molecular weight $M_N$ of 2700 to 4000 g/mol, and a melting temperature in the range from 80 to 150° C.

Particularly preferably, the second resin composition contains the previously mentioned compounds in a ratio of at least 80 wt. % and more particularly preferably at least 90 wt. %. In a particularly suitable embodiment, the second resin composition consists of the indicated compounds or mixtures of the indicated compounds.

The aromatic polyhydroxy ether P2 used in the second resin composition and the aromatic polyhydroxy ether P1 contained in the first resin composition can be the same or different. However, the condition must be fulfilled for the aromatic polyhydroxy ether P2 that it has a melting temperature in the range from 80 to 150° C.

To achieve a sufficiently high adhesive strength of the pre-impregnated yarns for the production of the fiber preforms, the second resin composition has a good adhesive force or adhesive strength above the melting temperature thereof. In a preferred embodiment, the second resin composition has an adhesive strength or adhesive force of at least 5 N at a temperature 20° C. above the melting temperature, in relation to an adhesive surface with a diameter of 25 mm. The determination of adhesive force or adhesive strength is carried out based on ASTM D 2979. In this case, the adhesive force is considered to be the force that is required to separate a sample of the second resin composition from an adhesive surface shortly after bringing the second resin composition and the adhesive surface into contact under a defined load and temperature and during a defined time. The details of the determination will be given later.

In view of the overall characteristics of the pre-impregnated yarns according to the invention and especially in view of achieving good impregnation characteristics for fiber preforms produced from the yarns during later infusion or injection with matrix resin, it is advantageous if the concentration of the second resin composition is greater than that of the first resin composition, it is likewise advantageous if the total concentration of the first resin composition and the second resin composition lies in the range from 1.5 to 13 wt. % in relation to the total weight of the pre-impregnated yarn.

In principle, any technology is suitable for the infiltration of the first resin composition into the yarn or the impregnation of the yarn with the first resin composition, which technology supports a fast and complete wetting of the reinforcing fiber filaments of the yarn with the first resin composition. Methods of this type are described for example in EP 1 281 498 A. For example, the yarn can be sprayed with a dispersion or an emulsion of the first resin composition. A film of the resin dispersion or resin emulsion can also be applied to a smooth roller or into the grooves of a roller and the yarn can be pulled over the smooth roller or through the grooves of the roller. Preferably, the yarn is fed through a bath which contains a dispersion or emulsion of the first resin composition. It is likewise possible that the yarn is successively impregnated with the individual components of the first resin composition, for example, in that the yarn is successively fed through different dispersion baths which contain the individual components of the first resin composition. In this case, the yarn provided for the impregnation step can be initially spread by means of a suitable spreading device to the desired width so that the individual fibers or individual filaments are easily accessible for impregnation. Preferably, the bundle of the yarn to be impregnated is brought into the shape of a flat band having the ratio of yarn width to yarn thickness desired for the final pre-impregnated yarn of the invention.

In principle, any liquid mixture is suitable as the liquid phase for the previously indicated resin dispersion or resin emulsion, which liquid mixture forms a stable dispersion or emulsion with the resins according to the invention. Among these liquid mixtures, in particular those which are aqueous and have a low VOC (volatile organic content) are suitable for emission protection reasons. The components of the first resin composition are thereby present advantageously as particles in the micrometer range, particularly preferably with a size less than 0.1 μm.

Naturally, the application amount of the first resin composition, in relation to the total weight of the yarn, can be adjusted via the speed with which the yarn is e.g. fed through a bath that contains the dispersion of the first resin composition, via the immersion length, and via the resin concentration in the bath. In this case, the speed with which the yarn is fed through the bath lies preferably in the range from 120 to 750 m/h, particularly preferably in the range from 150 to 550 m/h. Particularly good results are achieved at speeds in the range from 150 to 350 m/h. The immersion length lies preferably in the range from 0.2 to 1 m. The concentration of the components of the first resin composition in the dispersion lies preferably in the range from 2 to 35 wt. %, and particularly preferably in the range from 2 to 7 wt. %, in relation to the weight of the dispersion. The first resin composition can also be introduced in several steps to the initial yarn, in that the yarn is fed e.g. initially through a first bath with a dispersion of the resin components H1 and H2 and subsequently through a second bath with a dispersion of the polyhydroxy ether P1 as well as if applicable the resin components H4 and H5.

Following the impregnation of the yarn with the first resin composition, the yarn or the yarn bundle is loaded on the outer side thereof with the second resin composition. In this case, after the impregnation, the second resin composition is applied in the form of a powder to the outer side of the preferably still moist yarn bundle. The application of the second resin composition can take place e.g. via powder scattering methods, via aqueous dispersion or via fluidized bed processes, as is e.g. described in U.S. Pat. No. 5,275,883 or U.S. Pat. No. 5,094,883, wherein the particles can be preferably electrostatically charged, as is the case in electrostatic powder scattering.

The second resin composition present in particle form has a particle size distribution, wherein in a preferred embodiment the particle size distribution, as determined by laser diffractometry, has a D50 value for the average particle size in the range from approximately 20 to 120 μm and a D90 value in the range from 70 to 160 μm, both values characterizing the particle size. Particularly preferred is a particle size distribution with a D50 value in the range from 30 to 100 μm and a D90 value in the range from 85 to 155 μm.

A drying temperature in the range from 100 to 160° C. has been shown to be particularly suitable for drying the yarn provided with the first and the second resin compositions. By this means, the second resin composition is simultaneously melted and forms island-shaped particles or drops adhering to the bundle outer side.

The production of the pre-impregnated yarn of the invention can be integrated into the production process of the initial yarn, i.e. the impregnation of the yarn with the first resin composition and the application of the second resin composition on the yarn can directly follow the production process for the yarn provided. However, an initial yarn which is e.g. wound up on a spool can also be provided in a separate process with the first resin composition and subsequently with the second. It is likewise possible that an initial yarn which is impregnated with the first resin composition is provided wound up on a spool and is then furnished with the second resin composition in a separate process step. In these processes, as was explained, the impregnation or infiltration of the yarn with the first resin composition can take place in two or also in several steps.

The pre-impregnated yarn according to the invention can be used advantageously for the production of textile structures like fiber preforms.

A further, underlying object of the present invention is therefore achieved by a textile structure which comprises the previously-described yarns according to the invention, wherein the yarns preferably are connected to each other via the second resin composition at points of mutual contact. In a preferred embodiment, the textile structure is a fiber preform.

Although woven fabrics can also be produced from the yarns of the invention, said wovens, following melting and re-solidification of the resin compositions, resulting in e.g. an exceedingly non-slip fiber preform, it is advantageous to construct fiber preforms of this type directly from the yarns according to the invention because the yarns can thereby be positioned in the direction in which, during the use of a composite component produced from the fiber preform according to the invention, the highest mechanical loads are expected.

Thus, in a preferred embodiment of the fiber preform according to the invention, the yarns are arranged unidirectionally, by which means the preform can be further processed into a composite component, during the use of which the maximum mechanical load is expected to be in this one direction of the yarns.

In a further preferred embodiment of the fiber preform according to the invention, the yarns are arranged bidirectionally, tridirectionally, or multidirectionally, by which means the preform can be further processed into a composite component, during the use of which the maximum mechanical load is expected to be in these two or more directions of the yarns.

In addition to the previously mentioned flat embodiments of the fiber preform of the invention, the uni-, bi-, tri-, or multidirectionally arranged yarns can be wound around a body having, e.g. a cylindrical shape, such that a three-dimensional fiber preform results.

Further, an embodiment of the fiber preform is preferred in which the yarns according to the invention were chopped (short-cut) into short pieces and the pieces can be oriented in all spatial directions. By this means, this fiber preform is particularly suited for the production of a composite component, during the use of which mechanical loads can arise in all spatial directions.

A further underlying object of the present invention is achieved by a method for producing a fiber preform comprising the steps a) Provision of at least one of the yarns according to the invention, b) Arrangement of the at least one yarn in a configuration which corresponds to the configuration of the desired fiber preform, c) Heating of the configuration resulting from step b) to a temperature above the melting point of the second resin composition, and d) Cooling the configuration resulting from step c) to at least below the melting point of the second resin composition.

In a preferred embodiment of the method according to the invention, the configuration resulting from step b) is simultaneously compacted during the heating in step c).

The fiber preform or according to the invention the fiber preform produced according to the method according to the invention shows a pronounced anti-slip property because the yarns of the fiber preform of the invention are connected to one another at least via the second resin composition. Therefore, the fiber preform of the invention is easily handled, which is advantageous in particular during the further processing thereof into a composite component.

When the fiber preform according to the invention or the fiber preform produced according to the method of the invention should have openings, these openings can be realized by appropriate arrangement of the yarns and thus without any cutting losses. Thus, an expensive and labor-intensive cutting is avoided and no waste is generated. By this means, the production of composite components having openings is simplified and reduced in price.

Further, by using one of the yarns of the invention instead of a textile fabric during the production of the fiber preform of the invention or the fiber preform produced according to the method of the invention, the yarn can be positioned in the directions in which, during use of the subsequently produced composite component, the highest mechanical loads are expected.

For example, in a preferred embodiment of the method of the invention for producing a fiber preform, yarns according to the invention are arranged unidirectionally in step b) such that following step d) a fiber preform results in which the yarns are unidirectionally arranged.

In a further preferred embodiment of the method for producing the preform according to the invention, the yarns can be laid either in bi-, tri-, or multidirectional layers in step b) in a configuration that corresponds to the desired fiber preform. Yarns according to the invention can be used exclusively therein. Likewise, within a layer of yarns, only a part can consist of yarns according to the invention and the rest can be yarns, the filaments of which have no resin coating or have common yarn preparations used to improve the processability of carbon fibers. The yarns configured in the indicated way are heated in step c) of the method of the invention at a temperature that is above the melting point of the second resin composition, wherein the yarns are compacted if necessary. By this means, the yarns become tacky. After cooling to at least below the melting point of the second resin composition in step d), an preform is generated in which the yarns are arranged bi-, tri-, or multidirectionally.

In a further preferred embodiment of the method for producing the preform of the invention, the yarns according to the invention are cut into short pieces, which have e.g. a length of 1 to 1000 mm, preferably 1 to 40 mm, and the short yarn pieces are placed into a mold in step a). Afterwards, in step b) of the inventive method, the short yarn pieces are heated to a temperature above the melting point of the second resin composition, by which means the short yarn pieces become tacky and are thereby compacted if necessary. After cooling to at least below the melting point of the second resin composition in step d), an fiber preform is generated in which the yarns according to the invention are present as short yarns having isotropic directionality.

The fiber preform of the invention, or the fiber preform produced according to the method of the invention, or the fiber preform resulting from the inventive use can be used advantageously, due to the previously specified reasons, to produce a composite component that comprises a matrix, which is selected from one of the groups of polymers, metals, ceramics, hydraulically setting materials, and carbon, wherein thermoplastics like polyamides, copolyamides, polyurethanes and the like, or duromers such as epoxides are suitable as the polymer matrix, steel (alloys) or titanium are suitable for the metal matrix, silicon carbide and boron nitride are suitable as the ceramic matrix, cement or concrete is suitable as the hydraulically setting material, and graphite is suitable as the carbon matrix.

In the composite components resulting from the inventive uses, the yarns according to the invention are arranged in the direction in which, during use of the composite component, the greatest mechanical loads are expected. Thus, the inventive use of the yarns according to the invention and of the fiber preform produced therefrom leads to composite components in which the directionality of the yarns is custom adapted to the expected mechanical loads.

The invention will be described in more detail using the following examples and comparison examples. In so doing, the following methods of analysis will be used:

The epoxy value of the epoxy resins used is determined according to DIN EN ISO 3001:1999.

The molecular weight is determined by means of GPC analysis according to DIN 55672 after calibration with polystyrene (with tetrahydrofuran as the eluent).

The acid value in mg KOH/g is determined by titration with potassium hydroxide according to DIN 53240-2.

The particle size distribution is determined by means of laser diffractometry according to ISO 13320. The D50 and D90 parameters for the particle size are subsequently determined from the particle size distribution.

The melting temperature is determined by means of DSC according to DIN 65467.

The adhesive force of the second resin composition is determined at a temperature of 20° C. above the melting temperature, based on ASTM D2979. The adhesive strength or adhesive force is measured as the force that is required to separate a sample of the second resin composition from an adhesive surface shortly after bringing the second resin composition and the adhesive surface into contact under a defined load and temperature and during a defined time. For this purpose, a measuring apparatus is used, such as the MCR 301 rheometer (Anton Paar GmbH), which is equipped with corresponding force sensors and suitable for tensile tests. The determination of adhesive strength or adhesive force takes place with a plate/plate measuring geometry using plates made of aluminum (AlCuMgPb, Wst.-Nr. 3.1645, EN AW 2007) and with a plate diameter of 25 mm.

Approximately 5 g of the resin composition to be tested (preferably in powder form) is applied at ambient temperature to the lower plate of the plate/plate measuring system. Shortly before the contact of the sample material by the upper plate, the plates of the measuring system are brought together to a distance of approximately 2.025 mm. The sample is subsequently heated by means of a suitable temperature control device (e.g. Peltier temperature control system) to the required measuring temperature of 20° C. above the melting temperature of the second resin composition to be tested. After reaching the measuring temperature, the plates of the measuring system are brought together until contact with the sample material at 2 mm and the sample material is pressed together at a constant force of 10 N for 5 s.

Subsequently, the upper plate is moved upward at a constant withdrawal speed of 2 mm/s and a constant temperature, and the force required thereby is constantly recorded. The maximum value of the force required to pull the plates apart is used as the measurement for the adhesive force of the sample tested.

The concentration of the resin composition, in relation to the total weight of the yarn and resin composition, is determined via extraction by means of sulfuric acid/hydrogen peroxide according to EN ISO 10548, Method B.

EXAMPLE 1

A carbon fiber filament yarn with a linear density of 1600 tex and 24000 filaments was fed dry at a speed of approximately 480 m/h at a thread tension of 2000 cN through a bath with a first aqueous dispersion, containing components of a first resin composition. The bath was conditioned to a temperature of 20° C. The first aqueous dispersion contained as components of the first resin composition, in a total concentration of 15 wt. %, a urethane resin H1 based on a bisphenol A epichlorohydrin resin with two repeating units, a toluene diisocyanate, and a polyethylene oxide with ten repeating units, as well as an oxyalkylated bisphenol A resin H2 based on bisphenol A with ten repeating units of ethylene oxide and an ester H3 of palmitic acid and isopropyl alcohol. The weight ratio (H1:H2) of resins H1 and H2 to each other was 8 and the weight ratio (H1+H2):H3 was 9. The mixture of the components H1 to H3 in the first aqueous dispersion had a total concentration of 15 wt. %. The mixture of resins H1 and H2 had an epoxy value of 640 mmol/kg and high viscosity at ambient temperature with a viscosity of 990 Pa s.

After traversing the first bath containing the first aqueous dispersion of the first resin composition, the yarn infiltrated with the previously listed components of the first resin composition was dried at a temperature of 200° C. After drying, the carbon fiber filament yarn had components H1, H2, and H3 in a total concentration of approximately 1.0 wt. % in relation to the weight of the thereby impregnated yarn.

The thus pre-treated carbon fiber filament yarn was subsequently fed dry at a speed of approximately 100 m/h at a thread tension of 2500 cN through a second bath, which contained a second aqueous dispersion consisting of other components of the first resin composition. The second bath was conditioned to a temperature of 20° C. The second aqueous dispersion contained as further components of the first resin composition an epoxy resin H4 and an epoxy resin H5 in a total concentration of 0.2 wt. %, wherein the weight ratio H4:H5 of resins H4 and H5 was 1.2. The epoxy resin H4 had an epoxy value of approximately 2000 mmol/kg, an average molecular weight $M_N$ of 900 g/mol, and was solid at ambient temperature. The epoxy resin H5 had an epoxy value of 5400 mmol/kg, an average molecular weight $M_N$ of <700 g/mol, and was liquid at ambient temperature. The second aqueous dispersion further contained a linear aromatic polyhydroxy ether P1 in a concentration of 2.3 wt. %, with an acid value of 50 mg KOH/g and an average molecular weight $M_N$ of 4600 g/mol, which polyhydroxy ether was solid at ambient temperature.

After traversing the second impregnation bath the yarn now loaded with the first resin composition consisting of the components H1 to H5 and P1 in a total concentration of approximately 1.7 wt. % was fed moist through a conventional powder coating chamber, in which the second resin composition was applied via powder coating to the yarn infiltrated with the first resin composition. The second resin composition consisted of an epoxy resin H6, which had an epoxy value from 500 to 645 mmol/kg, an average molecular weight $M_N$ of 2900 g/mol, and was solid at ambient temperature. The magnitude of the adhesive force of the second resin composition was determined to be 10 N. The epoxy resin H6 was present in the form of a powder having an average particle size D50 of 70 μm and a D90 of 125 μm. The concentration of the second resin composition on the outer surface of the yarn was set via conventional measures such as via the volume flow of the particles of the second resin composition and/or the exhaust airflow.

After exiting the powder coating chamber, the carbon fiber filament yarn provided with the first and second resin compositions was dried at a temperature of 120° C. After drying, the pre-impregnated yarn obtained had a concentration of H1-H5 and P1 (first resin composition) of 1.7 wt. % and of H6 (second resin composition) of 5.1 wt. %, in each case in relation to the total weight of the pre-impregnated yarn.

The finished pre-impregnated yarn showed island- or drop-shaped adhesions of the second resin composition on the outer side while the yarn interior was free of the second resin composition. The pre-impregnated yarn had a stable form with a ratio of yarn width to yarn thickness of 15.9. The inside of the yarn provided with the first and second resin compositions showed a good compactness, i.e. the filaments of the carbon fiber filament yarn were at least partially connected to each other via the first resin composition. The adhesive strength of the impregnated yarn was good.

EXAMPLE 2

Applying the first aqueous dispersion in Example 1, a carbon fiber filament yarn provided dry with a linear density of 1600 tex and 24000 filaments was also fed at a speed of approximately 100 m/h and a thread tension of 2500 cN through a first bath with the first aqueous dispersion and impregnated with the components H1, H2, and H3 of the first resin composition.

Subsequently the yarn infiltrated with the previously listed components of the first resin composition was dried at a temperature of 150° C. After drying, the carbon fiber filament yarn had the components H1, H2, and H3 in a total concentration of approximately 0.9 wt. % in relation to the weight of the impregnated yarn.

The pre-treated carbon fiber filament yarn was subsequently fed dry at a speed of approximately 100 m/h and a thread tension of 1800 cN through a second bath, which contained a second aqueous dispersion comprised of further components of a first resin composition. The bath was conditioned to a temperature of 20° C. The second aqueous dispersion contained as a further component of the first resin composition a linear aromatic polyhydroxy ether P1 in a concentration of 2 wt. %, with an acid value of 50 mg KOH/g and an average molecular weight $M_N$ of 4600 g/mol, which polyhydroxy ether was solid at ambient temperature.

After traversing the second impregnation bath the yarn loaded with the first resin composition consisting of the components H1 to H3 and P1 in a total concentration of approximately 1.7 wt. % was fed moist as in Example 1 through a conventional powder coating chamber, in which the second resin composition was applied via powder coating to the yarn infiltrated with the first resin composition. The epoxy resin H6 used in Example 1 was likewise used as the second resin composition.

After exiting the powder coating chamber, the carbon fiber filament yarn provided with the first and second resin compositions was dried at a temperature of 120° C. After drying, the pre-impregnated yarn obtained had a concentration of H1-H3 and P1 (first resin composition) of 1.7 wt. % and of H6 (second resin composition) of 4.5 wt. %, in each case in relation to the total weight of the pre-impregnated yarn.

The finished pre-impregnated yarn showed island- or drop-shaped adhesions of the second resin composition on the outer side while the yarn interior was free of the second resin composition. The pre-impregnated yarn had a stable form with a ratio of yarn width to yarn thickness of 23.4. The inside of the yarn provided with the first and second resin compositions showed a good compactness, i.e. the filaments of the carbon fiber filament yarn were at least partially connected to each other via the first resin composition. The adhesive strength of the impregnated yarn was good.

COMPARATIVE EXAMPLE 1

A carbon fiber filament yarn with a linear density of 1600 tex and 24000 filaments was fed dry at a speed of approximately 240 m/h at a thread tension of 340 cN through a bath with the first aqueous dispersion used in Example 1 with the components H1, H2, and H3 of the first resin composition.

After traversing the bath (residence time=12 s) the yarn infiltrated with the components H1, H2, and H3 was dried at a temperature decreasing from 250° C. to 140° C. After drying, the carbon fiber filament yarn had the components H1, H2, and H3 of the first resin composition, in a concentration of 0.9 wt. %. The mixture of resins H1 and H2 had an epoxy value of 493 mmol/kg.

The thus pre-impregnated yarn had excessive flexibility and insufficient form stability, which is a prerequisite for good processability of the yarn. The adhesive strength of the yarns of the comparison example was insufficient; adhering together pieces of the pre-impregnated yarn of this Comparative Example was not possible.

EXAMPLE 3

The carbon fiber filament yarn, pre-impregnated with the first and second resin compositions, obtained according to Example 1 was wound on a metal plate, the two faces of which were each covered with a separating film, by means of a laboratory winding system at a thread speed of 23.1 mm/s and a thread tension of 400 cN, in each case up to the edge of the metal plate. The faces of the metal plate had dimensions of 280×300 mm$^2$, and each had first and second winding axes in the middle between the opposing edges.

Initially, a first winding layer with a fiber mass per unit area of 267 g/m$^2$ with a 90° orientation to the first winding axis was generated on the two sides of the metal plate. Afterwards, the metal plate was rotated by 90° such that the already present winding layer was oriented parallel to the second winding axis. In the next step, under identical winding conditions, a further winding layer with a 90° orientation to the first winding layer was applied to the already present winding layer, in this way, a layered structure with a 0° thread layer and a 90° thread layer resulted on each of the two sides of the metal plate. The previously described winding process was repeated until in each case four winding layers lay on top of each other on the two faces of the metal plate, which layers had alternating 0° and 90° thread orientations.

Subsequently, the winding layers on the two faces of the metal plate were each covered with a separating film. The metal plate was thereafter conditioned, complete with both respective four-layer winding structures and the separating films, in a press for 5 min at a surface pressure of 2 bar and a temperature of 125° C. The resulting pressing was cooled to below the melting point of the second resin composition (epoxy resin H6). Afterwards, the two winding packets were cut apart at the front surfaces of the metal plate and the four separating films were removed. In this way, two preforms resulted with a respective four-layer structure alternating between 0° and 90°, i.e. with a bidirectional arrangement of the yarns. The nominal thickness per thread layer was 0.25 mm.

The preforms were very dimensionally stable due to the high adhesive strength of the pre-impregnated yarns used and could be handled problem-free for further processing, in addition, after inserting the preforms in a mold, a good impregnation capability of the preforms was determined during the injection of a matrix resin.

COMPARATIVE EXAMPLE 2

The procedure was the same as in Example 3. However, the yarns obtained according to Comparison example 1 were used as the pre-impregnated yarns.

The preforms of the comparison example had no dimensional stability due to the low adhesive strength of the pre-impregnated yarns used. The handling during further processing was revealed as problematic due to the instability.

EXAMPLE 4

A square piece having an edge length of 200 mm was cut from a preform analogous to that produced in Example 3 and inserted into a mold having equal edge lengths and a height of 2 mm, which square piece however had an 8-layer structure with fiber layers only in the 0° orientation. An epoxy resin (type RTM6, Hexcel), previously heated to 80° C., was injected into the mold so that a composite material with a fiber volume proportion of 60 vol. % resulted. The preform impregnated with resin was cured at 180° C. A composite laminate resulted having an eight-layer structure with an orientation of the fibers in the 0° direction.

Test bodies were taken from the composite laminate to determine the inter-laminar shear strength (ILSS) according to DIN EN 2563 and the compressive strength and the compressive modulus according to DIN EN 2850. It was found that the mechanical characteristics of the composite laminate produced with the pre-impregnated yarns of the present invention were at the same level as corresponding characteristics of a laminate based on standard carbon fiber yarns (Tenax STS40 F13 24 K 1600 tex, Toho Tenax Europe GmbH), even though the concentration and the composition of the resin application of the yarns according to the invention differed significantly from concentration and composition of the standard carbon fiber yarns.

The invention claimed is:

1. A pre-impregnated yarn comprising:
   a bundle of reinforcing fiber filaments having a bundle interior and a bundle outer side,
   a first resin composition comprising:
      at least one urethane resin, H1, produced from a reaction of a bifunctional aromatic epoxy compound based on bisphenol A, an aromatic polyisocyanate, and a polyalkylene glycol,
      an oxyalkylated bisphenol A resin, H2, and
      aromatic polyhydroxy ether P1, which has an acid value in a range of from 40 to 55 mg KOH/g and an average molecular weight in a range of from 4000 to 5000 g/mol, and
   a second resin composition;
   wherein:
      the reinforcing fiber filaments are impregnated with the first resin composition infiltrated into the pre-impregnated yarn and the reinforcing fiber filaments are at least partially connected via the first resin composition,
      a weight ratio of the resin H1 to the resin H2 is in a range of from 1:1 to 15:1;
      a mixture of the resins H1 and H2 has a viscosity in a range of from 10 to 10,000 Pa·s at ambient temperature;
      the first resin composition is present in a concentration in a range of from 0.1 to 4 wt % relative to a total weight of the pre-impregnated yarn;
      the second resin composition is on the bundle outer side in the form of particles or drops adhering to the reinforcing fiber filaments,
      the second resin composition is solid at ambient temperature; has a melting temperature in a range of from 80 to 150° C., and is present on the bundle outer side in a concentration in a range of from 0.5 to 14 wt % relative to the total weight of the pre-impregnated yarn;

at least 40% of a surface of the bundle outer side is free from the second resin composition; and the bundle interior is free from the second resin composition.

2. The pre-impregnated yarn according to claim 1, wherein the first resin composition has a weight ratio of the urethane resin H1 and the oxyalkylated bisphenol A resin H2 to the aromatic polyhydroxy ether P1 in a range of from 0.05:1 to 20:1.

3. The pre-impregnated yarn according to claim 1, wherein the first resin composition further comprises an ester H3 of a long-chain saturated monofunctional carboxylic acid and an aliphatic monofunctional alkanol.

4. The pre-impregnated yarn according to claim 1, wherein:
the first resin composition further comprises a bisphenol A epichlorohydrin resin H4 and a bisphenol A epichlorohydrin resin H5 in a weight ratio H4:H5 in a range of from 1.1:1 to 1.4:1, H4 has an epoxy value in a range of from 1850 to 2400 mmol/kg, an average molecular weight in a range of from 800 to 1000 g/mol, and is solid at ambient temperature, and H5 has an epoxy value in a range of from 5000 to 5600 mmol/kg, an average molecular weight greater than 700 g/mol, and is liquid at ambient temperature.

5. The pre-impregnated yarn according to claim 1, wherein the first resin composition is present in a concentration in a range of from 0.4 to 3 wt % relative to the total weight of the pre-impregnated yarn.

6. The pre-impregnated yarn according to claim 1, wherein the second resin composition comprises at least 50 wt % of a bisphenol A epichlorohydrin resin H6 having an epoxy value in a range of from 480 to 645 mmol/kg and an average molecular weight in a range of from 2700 to 4000 g/mol, an aromatic polyhydroxy ether P2, a polyamide, a polyethylene, an ethylene copolymer, a thermoplastic polyurethane resin, or a combination thereof.

7. The pre-impregnated yarn according to claim 1, wherein the second resin composition has an adhesive strength of at least 5 N at a temperature of 20° C. above the melting temperature of the second resin composition, in relation to an adhesive surface having a diameter of 25 mm.

8. The pre-impregnated yarn according to claim 1, wherein the particles or drops of the second resin composition adhering to the reinforcing fiber filaments have a size less than 300 μm.

9. The pre-impregnated yarn according to claim 8, wherein the particles or drops of the second resin composition adhering to the reinforcing fiber filaments have an average size in a range from 20 to 150 μm.

10. The pre-impregnated yarn according to claim 1, wherein the concentration of the second resin composition is greater than that of the first resin composition.

11. The pre-impregnated yarn according to claim 1, wherein a total concentration of the first resin composition and second resin composition is in a range from 1.5 to 13 wt % relative to the total weight of the pre-impregnated yarn.

12. The pre-impregnated yarn according to claim 1, wherein the first resin composition and/or the second resin composition are free of curing agents.

13. The pre-impregnated yarn according to claim 1, wherein the pre-impregnated yarn is a carbon fiber yarn that is produced from pitch, polyacrylonitrile, lignin, viscose pre-products, aramid, glass, ceramic, boron fiber yarn, a synthetic fiber yarn, a natural fiber yarn, or a combination thereof.

14. The pre-impregnated yarn according to claim 1, wherein the pre-impregnated yarn is a flat band that has a ratio of a yarn width to a yarn thickness of at least 10.

15. The pre-impregnated yarn according to claim 14, wherein the ratio of the yarn width to the yarn thickness is in a range of from 12 to 60.

16. A textile structure comprising one or more of the pre-impregnated yarns according to claim 1.

17. The textile structure according to claim 16, wherein the pre-impregnated yarns are connected to each other at points of mutual contact at least via the second resin composition.

* * * * *